United States Patent [19]

Hertfelder

[11] 4,180,234
[45] Dec. 25, 1979

[54] PNEUMATICALLY OPERATED VALVE WITH A MANUALLY OPERATED BACK-UP DISPLACING MECHANISM

[75] Inventor: Wilhelm Hertfelder, Steinenbronn, Fed. Rep. of Germany

[73] Assignee: Robert Bosch GmbH, Stuttgart, Fed. Rep. of Germany

[21] Appl. No.: 828,228

[22] Filed: Aug. 26, 1977

[30] Foreign Application Priority Data

Sep. 21, 1976 [DE] Fed. Rep. of Germany ....... 2642305

[51] Int. Cl.² .................... F16K 31/42; F16K 31/524
[52] U.S. Cl. ................. 251/14; 137/DIG. 8; 251/30; 251/130; 237/12.3 B
[58] Field of Search ............. 251/14, 30, 130; 137/DIG. 8; 237/12.3 B

[56] References Cited

U.S. PATENT DOCUMENTS

| | | | |
|---|---|---|---|
| 2,633,098 | 3/1953 | Ellis | 251/14 X |
| 2,830,784 | 4/1958 | Placette | 251/14 |
| 3,737,140 | 6/1973 | Toth | 251/14 |
| 3,980,270 | 9/1976 | Thomas | 251/30 |

*Primary Examiner*—Arnold Rosenthal

*Attorney, Agent, or Firm*—Michael J. Striker

[57] ABSTRACT

A flow control valve for controlling the flow of heat-exchange medium in a circuit of a heat-exchanger is actuated into its open position by air at subatmospheric pressure derived from the intake manifold of an internal combustion engine of a motor vehicle the climate in the interior of which is to be controlled. An auxiliary mechanism is provided which, in the event of malfunction of the pneumatically operated actuator of the flow-through valve, can be manually displaced into an end position in which it holds the valve member in its open position, thus permitting the climate-controlling arrangement to work despite the failure of the pneumatically operated actuator. The auxiliary mechanism includes a bracket-shaped rocker-arm lever tiltably mounted on the housing of the flow-through valve, and a leaf spring which, in each of the end positions of the lever, acts on the latter in such a way as to keep it in its then assumed end position. The valve housing has slots through which an energizing portion of the lever extends to the exterior of the housing of the flow-through valve to be accessible thereat for manual tilting of the lever.

8 Claims, 6 Drawing Figures

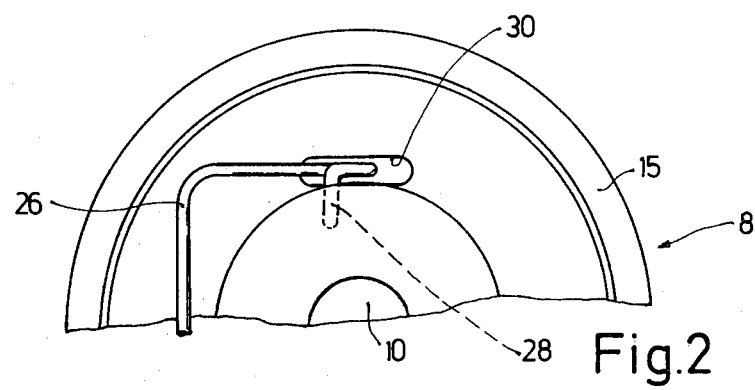
Fig.2
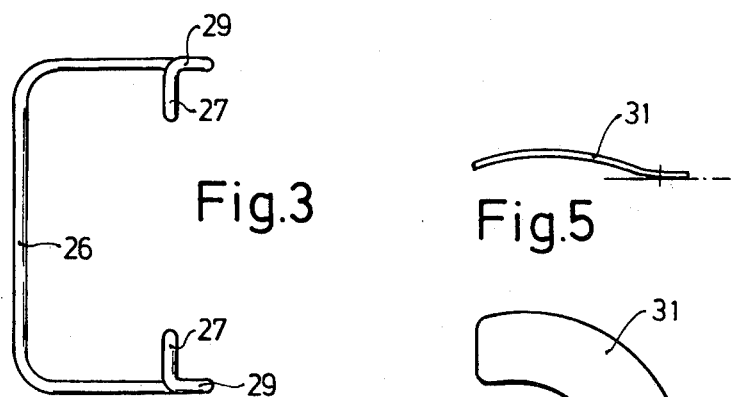
Fig.3
Fig.5
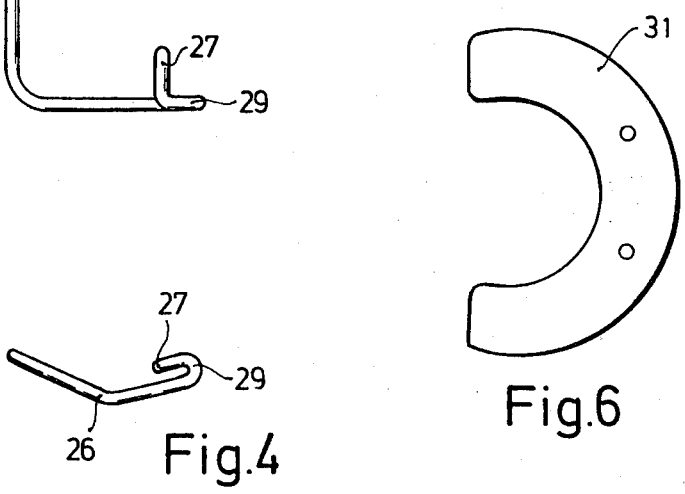
Fig.4
Fig.6

PNEUMATICALLY OPERATED VALVE WITH A MANUALLY OPERATED BACK-UP DISPLACING MECHANISM

BACKGROUND OF THE INVENTION

The present invention relates to a control of a flow-through valve in general, and more particularly to a control of a valve to be used in a motor vehicle for regulating a climate-controlling arrangement thereof.

Flow-control valves, even pneumatically operated ones, are already known in a variety of constructions and used in a multitude of applications. A pneumatically operated valve usually includes a control side which controls the flow of a medium through a conduit, and an actuating side to which a pneumatic fluid is admitted to act on the valve for moving the same at least between the open and the closed position thereof. For the operation of the valve only between the open and closed positions, it is already known to utilize the pressure differential between the pressure generated by a source which is in communication with the actuating side of the flow-control valve, and the ambient pressure.

In this context it has also been already proposed to utilize the subatmospheric pressure which develops in the intake manifold of the internal combustion engine of the vehicle for operating the flow-control valve of the climate-controlling arrangement of the vehicle. Under these circumstances, the subatmospheric pressure which exists at the actuating side of the flow-control valve due to the communication thereof with the intake manifold of the engine, displaces the valve member of the flow-control valve into its open position provided that the differential between the subatmospheric pressure and the ambient pressure is sufficiently great, while the flow-through valve remains closed when such pressure differential is small or non-existent.

Experience with the pneumatically operated flow-through valves of this type as used for regulating the flow of a heat-exchange medium through a circuit of an arrangement for controlling the climate inside a motor vehicle has shown that, generally speaking, these valves function to satisfaction. However, it has also been established that, under certain circumstances, the pneumatic operation of the valve may malfunction so that the entire climate-controlling arrangement becomes inoperative. There are several reasons why the actuating side of the flow-through valve may cease to operate. So, for instance, the conduit communicating the actuating side of the flow-through valve with the intake manifold of the engine may become obstructed so that the actuating pressure at the actuating side of the flow-through valve will be the same as the ambient pressure. On the other hand, a leak may develop at the actuating side of the flow-control valve so that, despite the communication of the actuating side with the intake manifold, no subatmospheric pressure will develop at the actuating side of the flow-control valve. Also, in a flow-control valve of the type having a switching element which admits either the subatmospheric pressure or the ambient pressure to the actuating side of the flow-control valve, which switching element is operated by an electromagnet, any malfunction in the operation of the electromagnet which causes the actuating side of the flow control valve to permanently communicate with the ambient atmosphere will result in a malfunction of the entire heat-exchange arrangement controlled by the flow-control valve.

SUMMARY OF THE INVENTION

Accordingly, it is a general object of the present invention to avoid the disadvantages of the prior art.

More particularly, it is an object of the present invention to develop a flow-control valve of the type here under consideration which, even in the event of malfunction of the pneumatically operated actuating side of the valve, can still be easily displaced towards its open position to render the operation of the heat-exchange arrangement possible.

A still other object of the present invention is to so construct the flow-control valve that it can be operated by hand in the event of such malfunction.

A concomitant object of the invention is to so design the flow-control valve as to be simple in construction, reliable in operation and inexpensive to manufacture.

It is yet another object of the present invention to devise a flow-control valve which can be arrested in its open position despite the malfunction of the pneumatically operated actuating side thereof.

In pursuance of these objects and others which will become apparent hereafter, one feature of the present invention resides, briefly stated, in a device for regulating the flow of a heat-exchange medium through a circuit of an arrangement for controlling the climate inside a motor vehicle, which comprises a flow control valve interposed in the circuit of the arrangement and displaceable between a closed and an open position; pneumatically operated means for displacing said valve between said positions thereof; and an auxiliary mechanism operative for displacing said valve toward said open position thereof in the event of malfunction of said pneumatically operated means so as to permit the arrangement to control the climate even in such an event. Preferably, the auxiliary mechanism is also operative for arresting said valve in said open position thereof.

When the device is constructed in the above-mentioned manner, the flow-control valve thereof can be opened even when the pneumatically operated displacing means fails to operate because of one of the above-discussed reasons, or for any other reason, by manually operating the auxiliary mechanism, whereafter the valve is maintained in its open position so that the heat-exchange medium is circulated through the circuit of the climate-controlling arrangement of the motor vehicle. So, for instance, in the winter-time, the interior of the motor vehicle can be heated and/or defrosted despite the fact that, for instance, the conduit communicating the intake manifold of the engine with the actuating side of the flow-control valve may have become clogged by ice deposits, or the flow-control valve may be originally frozen in its closed position, or the like.

The flow-control includes a valve housing and a valve member within said valve housing and displaceable relative thereto between the above-mentioned positions. Preferably, the auxiliary mechanism includes an arm-rocker lever tiltably mounted on the valve housing and operatively connected to the valve member. The lever is tiltable between two end positions, and advantageously arrestable in each of the end positions thereof.

In an advantageous embodiment of the present invention, the valve includes a sealing diaphragm which is connected to the valve housing to delimit a control space in the latter, the pneumatically operated means includes an actuator housing and an actuating diaphragm connected to the actuator housing to delimit an actuating space in the latter and arranged with a spacing from said sealing diaphragm, and an actuating rod connected to the actuating diaphragm and to the valve member and passing through the sealing diaphragm. Then, the lever is arranged, to advantage, in said spacing between said diaphragms and acts on the actuating diaphragm to displace the valve member towards the open position thereof.

In a further advantageous development of the basic concept of the present invention, the lever has pivoting portions mounting the lever on the valve housing for tilting about a pivot axis between the above-mentioned two end positions each of which corresponds to one of the positions of the valve member, the auxiliary mechanism further including means for arresting the lever in each of the end positions thereof, such arresting means including a spring member connected to the valve housing in said spacing between said diaphragms and so acting on said lever that the same is retained by the force of the spring member in the then assumed end position thereof. Thus, the spring member is so configurated and arranged that the force of the spring member urges the lever in one direction about the pivot axis thereof at one of the end positions of the lever and in the opposite direction at the other of said end positions of said lever. Advantageously, the spring member is a leaf spring.

It is further advantageous, as proposed by the present invention, to configurate the lever as a two-arm lever which has an engaging arm in contact with the actuating diaphragm and an operating arm, preferably shaping the lever as a wire bracket. Then the valve housing at least one slot communicating said spacing between said diaphragms with the exterior of the valve housing, the operating arm of the lever extending through said slot to be accessible at the exterior of the housing for tilting said lever.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a partial sectional view taken on line II—II of FIG. 1;

FIG. 3 is a top plan view of a rocker-arm lever used in the valve of FIG. 1;

FIG. 4 is a side elevational view of the rocker-arm lever of FIG. 3;

FIG. 5 is a side elevational view of a leaf spring used in the valve of FIG. 1; and FIG. 6 is a top plan view of the leaf spring of FIG. 5.

DETAILED DISCUSSION OF THE PREFERRED EMBODIMENT

Figure 1:
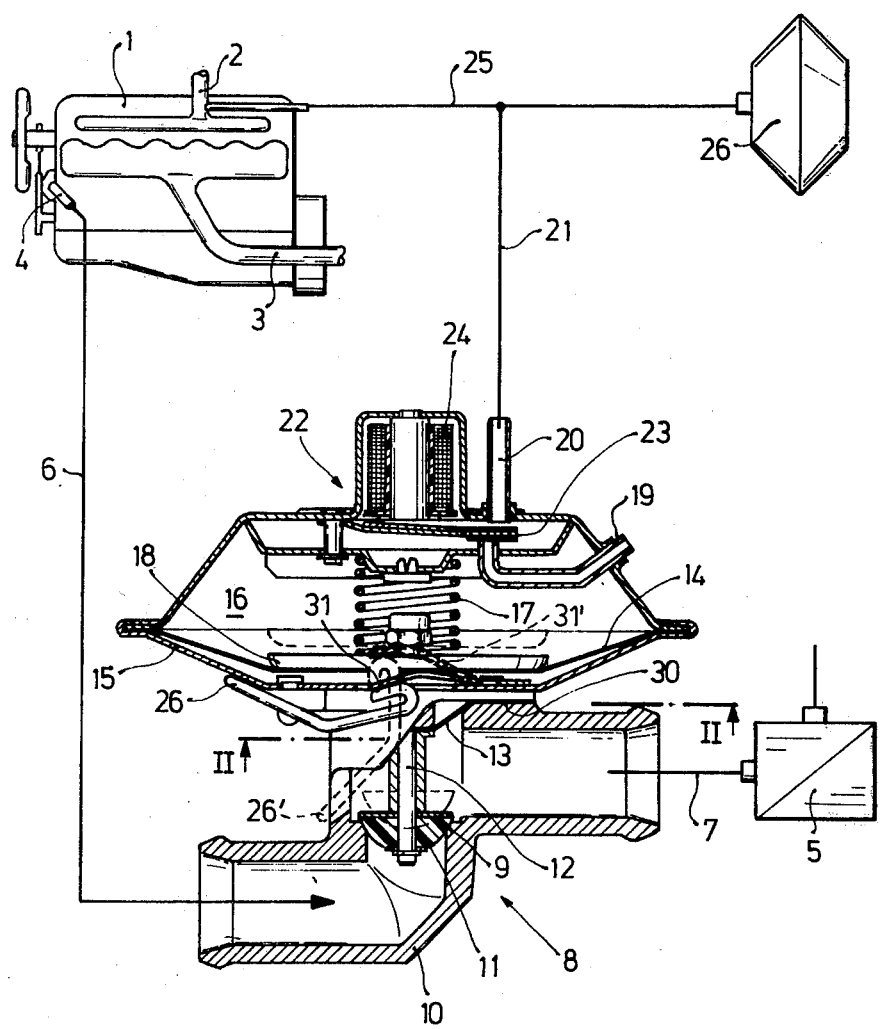
FIG. 1 is a somewhat diagrammatic cross-sectional view of a pneumatically operated valve for controlling the flow of a heat-exchange medium through a circuit of a heat-exchange arrangement for controlling the climate inside a motor vehicle.

Referring now to the drawing in detail, and first to FIG. 1 thereof, it may be seen therein that the reference numeral 1 has been used to designate an internal combustion engine in conjunction with which the device of the present invention is being used. The internal combustion engine 1 has an intake manifold 2 and an exhaust manifold 3. At the front side of the internal combustion engine 1, there is arranged, in a conventional manner, a circulating pump 4 which is energized by the engine 1, the circulating pump 4 being operative for circulating a fluid medium serving as a heat-exchange medium, through a conventional cooling circuit of the internal combustion engine 1 which is conventional and thus has not been illustrated. In most instances, the fluid medium which serves as a heat-exchange medium is water.

A heat-exchange arrangement 5 for controlling the climate inside the motor vehicle, illustrated diagrammatically, is accommodated in the interior of the motor vehicle, such as in a passenger compartment thereof. In the following, the present invention will be discussed as embodied in an arrangement for heating the interior of the motor vehicle but it is to be understood that the concept of the present invention can also be utilized in connection with an arrangement for air-conditioning the interior of the vehicle.

A part of the water circulated by the circulating pump 4 is delivered to the heat-exchanger 5 through a conduit 6, 7. An electrically energized pneumatically operated flow-control valve 8 is interposed between the sections 6 and 7 of the conduit 6, 7, which valve 8 controls the flow of the water from the circulating pump 4 to the heat-exchanger 5. The valve 8 has a valve housing 10 at its control side, the valve housing can be provided with a valve seat 9. The valve housing 10 has an inlet nipple connected to the conduit section 6 and an outlet nipple connected to the other conduit section 7.

A valve member 11 cooperates with the valve seat 9 to control the flow of the heat-exchange medium through the valve housing 10. The valve member 11 is mounted on a connecting rod 12 which passes through a sealing diaphragm 13. The sealing diaphragm 13 delimits and seals a control space within the valve housing 10 with respect to the exterior of the valve housing 10 and also with respect to the other components of the device.

The free end of the connecting rod 12 which is remote from the valve member 11 is connected, in a conventional manner, to an actuating member 14 which, in the illustrated embodiment of the present invention is constructed as an actuating diaphragm 14 that is acted upon by a pneumatic fluid. The actuating diaphragm 14 is sealingly connected at its outer margin, to an actuator housing 15 to delimit an actuating space 16 within the latter. A spring 17 is accommodated within the actuating space 16, abutting at one of its ends against the upper wall of the actuator housing 15, and resting at its other end on a dish-shaped member 18 which is connected with the connecting rod 12 and which is in contact with the actuating diaphragm 14. The spring 17 presses the valve member 11 against the valve seat 9 when the pressure in the actuating space 16 of the actuator housing 15 is at the ambient pressure.

A venting tube 19 communicates the actuating space 16 with the ambient atmosphere, while a connecting tube 20 communicates the actuating space 16 with a suction conduit 21. The venting tube 19, on the one hand, and the connecting tube 20 have respective ports which are coaxially aligned with one another and located at a distance from each other, and a magnetically energized switching valve 22 controls the communication of such ports with the actuating space 16. The magnetically energized valve 22 consists of a switching valve member 23 connected to a flexing spring, and an electromagnet 24 which, when de-energized, releases the switching valve member 23 so that it can assume, due to the action of the flexing spring, its position illustrated in FIG. 1 in which it interrupts the communication of the port of the venting tube 19 with the actuating space 16 while permitting communication of the port of the connecting tube 20 with the actuating space 16. On the other hand, when the electromagnet 24 is energized, it attracts the flexing spring carrying the switching valve member 23 so that the latter interrupts the communication of the port of the connecting pipe 20 with the actuating space 16 and permits the port of venting tube 19 to communicate with the actuating space 16.

The end of the suction conduit 21 which is remote from the connecting tube 20 is joined and communicates with a suction duct 25. The suction duct 25, in turn, communicates with the intake manifold 2 of the internal combustion engine 1, at one of its ends, while communicating with a conventionally constructed braking power amplifier 26, which is only diagrammatically illustrated, at its other end. Thus the subatmospheric pressure prevailing in the intake manifold 2 of the internal combustion engine 1 will also exist in the suction duct 25, in the suction conduit 21, in the connecting tube 20 and, when the switching valve member 23 is in its illustrated position, also in the actuating space 16 of the actuator housing 15.

At the exterior of the flow-control valve 8, there is provided, in a spacing between the sealing diaphragm 13 and the actuating diaphragm 14, a rocker-arm lever 26 which is constructed as a two-armed lever. The lever 26 is mounted on the valve housing 8 for tilting relative thereto between an end position illustrated in full lines in FIG. 1 and another end position which is illustrated in broken lines and designated with the reference numeral 26'.

As illustrated in more detail in FIGS. 3 and 4, the rocker-arm lever 26 is constructed as a wire bracket which has two ends 26 extending toward each other in alignment with one another and together defining a pivot axis of the rocker-arm lever 26. The ends 27 of the lever 26 are received in corresponding receiving depressions 28 provided in the valve housing 10, as illustrated in FIG. 2.

Two cooperating wire loops 29 which constitute the shorter lever arm of the rocker-arm lever 26 extend through associated slots 30 of the actuator housing 15 and contact the outer surface of the actuating diaphragm 14 which faces away from the dish-shaped member 18.

The rocker-arm lever 26 constitutes a component of an auxiliary mechanism, which further includes a leaf spring 31 which is illustrated in more detail in FIGS. 5 and 6. The leaf spring 31 has a semi-circular configuration and has free ends. The leaf spring 31 is arranged between the wire loops 29 of the rocker-arm lever 26 and the actuating diaphragm 14, by its free ends. The leaf spring 31 is arranged in the interior of the actuator housing 15 and is connected, by rivets or the like, to the actuator housing 15 which, in turn, is connected to the valve housing 10. The leaf spring 31 is also illustrated in FIG. 1 in its two positions assumed when the lever 26 is in its respective end positions, one of such positions of the spring 31 being shown in broken lines and designated with the reference numeral 31'.

When the rocker-arm lever 26 is in its position shown in full lines in FIG. 1, the leaf spring 31 exerts a retaining force on the lever 26, the vector of which is located to the right side of the pivot axis of the rocker-arm lever 26 defined by the ends 27 of the rocker, as seen in FIG. 1. Thus, the leaf spring 31 holds the rocker-arm lever 26 in the position illustrated in full lines in FIG. 1.

Now, when the internal combustion engine 1 of the motor vehicle is started, subatmospheric pressure develops in the intake manifold 2 of the internal combustion engine 1, and such subatmospheric pressure propagates through the suction duct 25, the suction conduit 21 and the connecting tube 20 into the actuating space 16 of the actuator housing 15, provided that the magnetic switching valve 22 is de-energized. The atmospheric pressure which acts on the surface of the actuating diaphragm 14 which faces away from the actuating space 16 thus lifts the valve member 11 from its valve seat 9 against the force of the spring 17 so that the heat-exchange medium can stream through the valve housing 10. The water which is advanced by the circulating pump 4 and which serves as a heat-exchange medium then flows through the pneumatically operated valve 8 into the heat-exchanger 5 and from there through non-illustrated conventional conduits back into the cooling circuit of the internal combustion engine 1. Thus, the heat-exchanger 5 commences its heating function and warms up the interior of the motor vehicle.

On the other hand, when the electromagnet 24 of the magnetic switching valve 22 is electrically energized, the switching valve member 23 is moved into its other switching position so that the actuating space 16 is communicated with the ambient atmosphere through the venting tube 19, whereupon the spring 17 displaces the valve member 11 into its closed position in which it abuts against the valve seat 9. Thus, the water flow through the valve 8 is interrupted so that the heat-exchanger 5 is no longer capable of radiating any heat into the interior of the motor vehicle. This operation can be conducted or repeated in the above-discussed manner when subatmospheric pressure can develop in the actuating space 16 of the actuator housing 15.

However, when this is not the case, which can occur upon the rupture of the suction conduit 21, obstruction thereof, or leakage of the ambient atmosphere into the actuator housing 15, then the pneumatic operation of the valve 8 becomes ineffective and the valve member 11 remains in abutment with the valve seat 9. The same result occurs when, due to a malfunction, a control arrangement constantly supplies the electromagnet 4 with an electric current or when the various displaceable components are mechanically retained, such as frozen, in the position which corresponds to the closed position of the valve member 11. In either event, the pressure differential between the ambient pressure and the pressure prevailing in the actuating space 16 would be either non-existent or so small as not to be capable of moving the valve member 11 into its open position.

Such a defect of the heating plant of the motor vehicle would be particularly disadvantageous during the cold season. Especially when the motor vehicle, for instance, was not garaged overnight, and as a result thereof, has cooled, it is still required that the interior of the vehicle be heated or defrosted even if the above-discussed malfunction of the pneumatically operated actuator of the valve 8 occurs. To achieve this, the rocker-arm lever 26 is manually tilted from its end position illustrated in FIG. 1 in full lines into its end position 26' illustrated in FIG. 1 in broken lines. Then, the shorter lever arm 27 of the rocker-arm lever 26 presses, via the interposed leaf spring 31 against the outer surface of the actuating diaphragm 14 and thus lifts the valve member 11 from its valve seat 9. When this happens, the dish-shaped member 18 and the valve member 11 assume their positions indicated in FIG. 1 in phantom lines. When the lever 26 assumes its end position 26', the leaf spring 31 in its position 31' then exerts upon the respective wire loop 29 constituting the shorter lever arm a retaining force the vector of which is located to the left side of the pivot axis defined by the ends 27, as seen in FIG. 1. Thus, the lever 26' is urged by the leaf spring 31' in the counterclockwise direction, that is, the lever 26 is retained by the spring 31 in its end position 26', until manually released. Thus, the lever 26 in its position 26' holds the valve member 11 in its open position and the heat-exchange medium, such as a heating water, can circulate through the conduit 6, the valve housing 10, the conduit 7, and the heat-exchanger 5 to warm up the interior of the motor vehicle despite the failure of the pneumatic operation of the valve 8.

It will be understood that each of the elements described above, or two or more together, may also find a useful application in other types of constructions differing from the types described above.

While the invention has been illustrated and described as embodied in a device for regulating flow of heating water through a circuit of a heating plant of a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A device for regulating the flow of a heat-exchange medium through a circuit of an arrangement for controlling the climate inside a motor vehicle, comprising a flow-control valve interposed in the circuit and displaceable between a closed and an open position, said valve including a valve housing and a valve member within said valve housing and displaceable relative thereto between said positions, and a sealing diaphragm connected to said valve housing to delimit a control space in the latter; pneumatically operated means for displacing said valve between said positions thereof, including an actuator housing and an actuating diaphragm connected to said actuator housing to delimit an actuating space in the latter and arranged with a spacing from said sealing diaphragm, and an actuating rod connected to said actuating diaphragm and to said valve member and passing through said sealing diaphragm; and an auxiliary mechanism operative for displacing said valve toward said open position thereof in the event of malfunction of said pneumatically operated means so as to permit the arrangement to control the climate even in such an event, said mechanism including a rocker-arm lever tiltably mounted on said valve housing and operatively connected to said valve member, and wherein said lever is arranged in said spacing between said diaphragm and acts on said actuating diaphragm to displace said valve member toward said open position thereof.

2. A device as defined in claim 1, wherein said auxiliary mechanism is also operative for arresting said valve in said open position thereof.

3. A device as defined in claim 1, wherein said lever is tiltable between two end positions; and wherein said lever is arrestable in each of said end positions thereof.

4. A device as defined in claim 1, wherein said lever has pivoting portions mounting said lever on said valve housing for tilting about a pivot axis between two end positions each corresponding to one of said positions of said valve member; and wherein said auxiliary mechanism further includes means for arresting said lever in each of said end positions thereof, including a spring member connected to said valve housing in said spacing between said diaphragms and so acting on said lever that the same is retained by the force of the spring member in the then assumed end position thereof.

5. A device as defined in claim 4, wherein the force of said spring member urges said lever in one direction about said pivot axis at one of said end positions of said lever and in the opposite direction at the other of said end positions of said lever.

6. A device as defined in claim 4, wherein said spring member is a leaf spring.

7. A device as defined in claim 1, wherein said lever is configurated as a two-arm lever having an engaging arm in contact with said actuating diaphragm and an operating arm.

8. A device as defined in claim 7, wherein said lever is a wire bracket; and wherein said valve housing has at least one slot communicating said spacing between said diaphragms with the exterior of said valve housing and through which said operating arm of said lever extends to be accessible at said exterior for tilting said lever.

* * * * *